Dec. 29, 1964     R. S. WROTH ETAL     3,163,743
ELECTRIC ARC WORKING WITH HOT WIRE ADDITION
Filed June 26, 1962

INVENTORS
ROBERT S. WROTH
NORMAN REIS
AUGUST F. MANZ

ATTORNEY

United States Patent Office

3,163,743
Patented Dec. 29, 1964

3,163,743
ELECTRIC ARC WORKING WITH HOT WIRE ADDITION
Robert S. Wroth, Santa Monica, Calif., and Norman Reis, Fords, and August F. Manz, Newark, N.J., assignors to Union Carbide Corporation, a corporation of New York
Filed June 26, 1962, Ser. No. 205,284
5 Claims. (Cl. 219—137)

This invention relates to work-in-circuit electric arc working with nonconsumable electrode and, more particularly, to such process wherein a consumable wire is used to deposit material supplied by such wire on the work.

Industry constantly seeks new processes, methods, and techniques to improve electric arc welding operations in order to reduce costs and/or improved weld quality. Weld quality is especially important in such critical areas as in fabricating aircraft and missile components. Present practice in this field generally dictates the use of nonconsumable electrode electric arc welding for thin sections up to about ⅛ in. thick and consumable electrode electric arc welding for heavier sections. With such processes, acceptable welds can be made in ferrous and nonferrous materials alike, however, both processes have limitations which would be desirable to eliminate.

For example, in nonconsumable electrode electric arc welding extremely high quality welds can be produced. However, welding speeds are very slow and the thickness range is limited to materials approximately ⅛ in. thick or less. Furthermore, in order to produce consistent results, control of welding variables is extremely critical. This is especially true when adding filler metal to the joint being welded. Small variations in the angle and position at which the filler wire enters the puddle will have an adverse effect on weld quality. Such conditions may occur due to, among other factors, minor variations in the curvature of the wire. In addition, it is always necessary to add the filler wire into the leading edge of the puddle with respect to the direction of travel. This, of course, is the area of the puddle in which the arc is impinging on the workpiece and, since the wire is entering the puddle cold, it tends to chill the puddle. Thus, minor fluctuations in the wire feed adversely affect weld penetration.

Another disadvantage of nonconsumable electric arc welding lies in the fact that the process is very sensitive to arc voltage or arc length variation. Small changes in arc length produce changes in both the arc voltage and arc current. Arc length then must be very closely controlled in order to produce consistent results. This is usually accomplished by the use of an electric arc voltage control which, however, makes the welding apparatus costly and complicated.

The slow welding speeds inherent in nonconsumable electrode welding, result in a disadvantage which is, in addition to the cost factor associated with low welding speeds. That is, in welding heat-treatable alloys, especially those of aluminum such as are commonly used in aircraft and missile applications, the low welding speed results in excessive heat input into the base material precipitating some of the alloying elements. This in turn reduces the tensile strength of the alloy in the heat-affected zone. The faster the weld can be made, the less the base material is effected by the welding operation. Therefore, high welding speeds are very desirable when welding heat-treatable materials. This is particularly important in those applications in which it is impossible to re-heat-treat large fabricated units after welding.

Consumable electrode electric arc welding is considerably faster than nonconsumable electrode electric arc welding. On the other hand, weld quality is more difficult to achieve. Porosity-free welds are difficult to produce, especially on thin material where the weld must be made "cold" to prevent burning through the workpiece. Such conditions tend to produce microporosity which is virtually impossible to eliminate.

A welding process was sought that would incorporate the speed advantage of consumable electrode electric arc welding and still produce the quality associated with nonconsumable electrode electric arc welding—even for materials heavier than ⅛ in. thick.

A slight improvement in welding speed was achieved and the material thickness range was approximately doubled. With a transferred constricted arc process it was now possible to produce sound, fully penetrated welds in stainless steel up to ¼ in. in thickness in just a single welding pass. Quite unexpectedly, extremely uniform control of weld underbead and penetration was achieved with such process, even when small variations in arc length occurred. One adverse result was encountered in that severe undercutting was frequently produced along the edges of the weld bead. It was found, however, that this could be effectively eliminated by adding filler metal in the form of wire into the front of the weld puddle.

Attempts to weld aluminum with the transferred constricted arc process, on the other hand, met with little success. In order to explain why results on aluminum did not meet expectations, it is necessary to understand how aluminum behaves in the presence of a direct current, nonconsumable electrode arc. In the past aluminum has been welded with direct current nonconsumable electrode arcs using helium to shield the weld and with straight polarity power. Straight polarity arcs provide no cleaning action and surface oxides on the material have a deleterious effect on weld quality and appearance. Even so, it has been possible to make satisfactory welds using straight polarity welding power with a helium shield. The high arc voltage gradient and high heat input with helium makes this possible. However, since cleaning action is absent, great care must be taken in preparing weld joints and welding conditions are very critical.

On the other hand, as described in U.S. Patent No. 2,906,857, O. H. Nestor, it is possible to weld aluminum using argon and reverse polarity which produces a wide cleaning path. As taught in this patent, it is necessary to use a water-cooled copper electrode rather than a refractory metal electrode, since the refractory metal electrode can not withstand the heat unless it is of excessively large diameter. Welding with the process described in this patent, however, has not proven satisfactory since the arc is very unstable and tends to wander about the surface of the workpiece.

It was discovered that when welding aluminum a very stable arc could be produced using a transferred, constricted, direct current, reverse polarity arc in an argon atmosphere with a water-cooled copper electrode. With this combination arc cleaning action on the workpiece was excellent. Also, lack of sensitivity to arc length variation and the unexpected uniformity or underbead and penetration was again achieved—as in the case of stainless steel welding. Again, however, undercutting was prohibitive. The addition of filler metal positively eliminated the undercutting, however, it became apparent that control over the wire entering the puddle was extremely critical, more so even, than in nonconstricted arc welding.

It was extremely difficult to get the filler wire to flow uniformly into the puddle. The wire tended to ball up, oxidize, and contaminate the weld. The best results were achieved by providing an outer, or auxiliary, shield of inert gas and feeding the wire into the arc just above the workpiece rather than feeding it directly into the puddle. Helium was the most satisfactory gas for the auxiliary shield. Even with these techniques, results were inconsistent. In addition, very high helium flows were necessary in the auxiliary shield and consumables costs would be prohibitive.

A method was then sought and found for welding with a transferred, direct current constricted arc with filler metal that could be added simply and without any adverse effects either on weld quality or on the other welding parameters.

The object of this invention is to provide a method of welding both ferrous and nonferrous metals which produces high quality welds at high speed and in which control over welding variables is less critical than with prior art welding processes.

Another objective of this invention is to provide a method of welding in which thicker sections can be welded at higher speeds than is possible with nonconsumable electrode electric arc welding.

Still another objective is to provide an improved method of welding aluminum and aluminum alloys.

Still another objective is to provide a method whereby filler metal can be consistently and satisfactorily added to transferred, constricted, reverse polarity arc welds on aluminum with argon shielding.

In a co-pending application, Consumable Electrode Arcless Electric Working, filed February 5, 1962, now U.S. Patent No. 3,122,69 issued February 25, 1964, in the name of A. F. Manz, a novel method of depositing metal on a workpiece is described. The method consists of melting a continuously fed wire electrode by means of the I²R heating generated in an electrical power circuit consisting of a power supply, the continuously fed electrode, and the workpiece which are connected in series circuit relationship with each other.

How these objects are provided by the system of the present invention will become more readily apparent from a review of the attached drawings and from the following description:

In general, the objects of the invention are accomplished by an electric arc working process wherein an arc is established between a nonconsumable electrode and the workpiece and then introducing an arc gas into the region of the arc to produce an arc plasma, constricting and collimating the arc and arc plasma and then directing the so constricted and collimated arc and arc plasma as an arc effluent against the workpiece to form a molten puddle thereon, feeding a wire from a source of wire to the molten puddle and then continuously forming an arcless short circuit between the wire and the molten puddle to energize the end of the wire with current flowing through such end to thereby continuously deposit molten material supplied by the so fed wire on the workpiece while shielding the zone of the molten puddle.

To weld either ferrous or nonferrous metals with the system of the present invention, the same procedures are used. The only differences are due to the fact that such metals as aluminum and magnesium require the use of direct current reverse polarity (electrode positive) power, whereas, direct current straight polarity (electrode negative) power is used for ferrous metals. In order to use reverse polarity welding power, the torch must be provided with a water-cooled electrode according to U.S. Patent No. 2,906,857, O. H. Nestor. For straight polarity welding a conventional refractory metal stick electrode is preferred.

Figure 1:
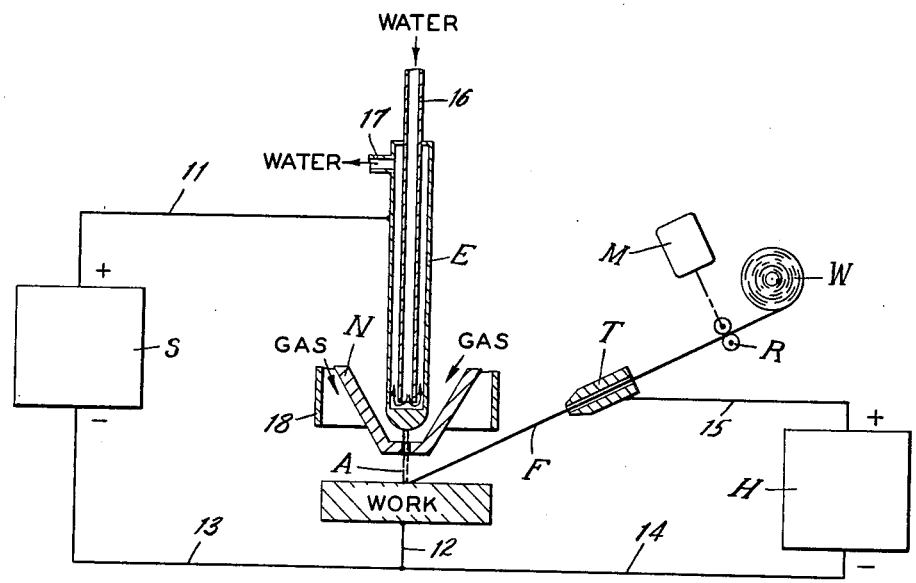
FIGURE 1 is a diagram of the apparatus for practicing the invention in the welding of nonferrous metals such as aluminum and magnesium.

According to the present invention, as shown in FIG. 1, welding is performed by means of an inert gas shielded arc A, which is struck between torch electrode E and the workpiece. Power is supplied to the arc from a direct current main power supply S through electrode power cable 11, electrode E, arc A, workpiece, and ground power cables 12 and 13. In the particular case shown, the electrode E is connected to the positive terminal and the workpiece to the negative terminal of the power suppuly S; thus, estabishing a reverse polarity arc for welding aluminum. The torch electrode E is water-cooled, water entering through water tube 16 and leaving through an outlet fitting 17 in electrode E. Gas for the arc effluent is passed through the chamber between electrode E and nozzle N and is discharged with the arc through the orifice in nozzle N. Nozzle N serves to constrict the arc.

Additionally, there is provided a hot wire power supply H which is connected to contact tube T by power cable 15 and to the workpiece through power cables 12 and 14. Hot wire power supply H is connected so that the workpiece is negative and the contact tube is positive. At a preselected time, in the welding operation, the operator energizes "hot" start power supply H and wire feed motor M. This is normally done as soon as the base metal is sufficiently melted to form a puddle. Wire feed motor M continuously feeds filler wire F into the puddle through contact tube T by means of feed rolls R. When filler wire F contacts the puddle a circuit is completed from "hot" wire power supply H, through conductor 15, contact tube T, filler wire F, the workpiece and cables 12 and 14. Electric current flows through said circuit heating the extended portion of filler wire F between contact tube T and the workpiece as a result of the I²R power consumed in this portion of the circuit. The filler wire F is continuously melted at a uniform rate—in part by this I²R heating and in part by the heat radiated from the arc as well as by the heat picked up by conduction from direct contact with the molten puddle—and deposited in the weld zone. Welding then progresses continuously along the weld seam.

It is to be noted, in FIG. 1, that the torch is provided with an auxiliary shielding nozzle 18. This is necessary since the gas discharged through the orifice of nozzle N is insufficient to shield the entire weld zone. For this reason, auxiliary shielding nozzle 18 is provided, from which is discharged an annular stream of inert gas to protect the weld zone from atmospheric contamination. Preferably the shielding gas should be a coherent stream of substantially nonturbulent gas flowing in a direction substantially parallel to the axis of the nonconsumable electrode as is described in complete detail in co-pending application, Serial No. 24,550, filed April 25, 1960 now U.S. Patent No. 3,053,968 issued September 11, 1962, in the name of E. F. Gorman et al. For welding aluminum and magnesium with the system of the present invention, argon is preferred for both the arc effluent and the auxiliary shield. However, any inert gas, such as helium, could be used. Argon is preferred for the arc effluent since the life of the water-cooled electrode E is considerably greater and higher currents can be used when argon is used rather than helium. Argon is also preferred in the auxiliary shield since, with helium, very high flow rates are required in order to obtain satisfactory protection of the weld zone and costs would be prohibitive.

Figure 2:
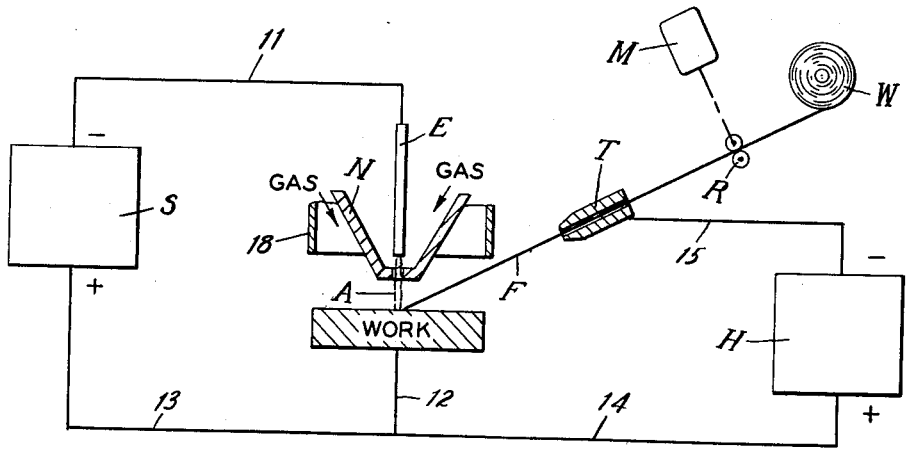
FIGURE 2 is a diagram of the apparatus for practicing the invention in the welding of ferrous metals.

To weld ferrous metals, such as stainless steel, using the apparatus of FIG. 2, operating procedures are the same as for welding aluminum using the apparatus of FIG. 1. The only differences lie in the polarity of the power supplies and in the use of a stick refractory metal electrode. The shielding gases may also differ from those used on aluminum. Again, with ferrous metals, the auxiliary shielding nozzle is required for the same purpose. Preferably, the effluent gas discharged through the orfice of nozzle N is argon or an argon-hydrogen mixture when welding stainless steel. Helium can also be used. The auxiliary shield may consist of any inert or semiinert gas, such as argon, helium, $CO_2$, nitrogen, or mixtures thereof.

In the course of experiments using the system of the present invention to weld aluminum it was unexpectedly discovered that the filler wire could be deposited in the puddle behind the arc relative to the direction of travel. Heretofore, this has never been possible, either with nonconsumable electrode electric arc welding or with transferred constricted arc welding. The reason for this is that in the prior art, the wire entering the weld zone was cold and tended to chill the puddle. To deposit the filler metal uniformly in the joint, it was necessary to add it in close proximity to the arc so that the arc itself could provide the heat to melt the wire. In practice, the wire was added at the leading edge of the puddle. Attempts to add the filler wire in the trailing edge of the puddle were unsuccessful. The wire entering the relatively cool portion of the puddle chilled it sufficiently that the puddle froze almost instantaneously and the deposited metal tended to pile up and would not flow sufficiently to bridge the joint. In many cases the wire would freeze the puddle and then dig a groove in the plastic-like "hot" weld metal without filling in the joint.

With the present invention, this disadvantage no longer exists. The wire fed into the puddle is "hot" by virtue of the $I^2R$ heating. It can be added so that as it reaches the puddle it is in virtually a molten state. As a result, the wire does not chill the puddle, thus, it can be added well behind the arc where it then flows out to fully bridge the joint. Arc heat is no longer needed to melt the filler wire directly.

An unexpected advantage resulting from this discovery lies in the fact that the added filler metal has virtually no influence upon the arc. The wire can be added into the trailing portion of the puddle where the arc is not impinging. As a result, small variations in the feed of the filler wire have little or no effect upon the penetration. The arc condition is virtually independent of the wire feed and can be selected to produce the desired penetration. The wire feed speed and $I^2R$ heating of the filler wire can be so selected as to produce the desired weld metal reinforcement while maintaining the desired puddle fluidity.

Test welds have been made to compare the system of the present invention with the prior art welding processes. Representative samples of butt welds were made on 6061 aluminium—a heat treatable alloy. Welds were made with the transferred constricted arc process with both "hot" and cold filler wire addition and with conventional Heliarc welding using Balanced wave A.C. power. Table I summarizes both welding conditions and physical test results for each process.

TABLE I

*Operating Conditions and Physical Test Results for Aluminum Welds Made With the System of the Present Invention and With Prior Art Welding Procedures*

| | Transferred Constricted Arc Welding with "Hot" Wire Addition | Transferred Constricted Arc Welding with "Cold" Wire Addition | Nonconsumable Electrode Electric Arc Welding |
|---|---|---|---|
| Joint | Square Butt | Square Butt | Squart Butt. |
| Material | 3/32 in., Type 6061–T6 | 3/32 in., Type 6061–T6 | 3/32 in. Type 6061–T6. |
| Preparation | Chemical Cleaning | Chemical Cleaning | Chemical Cleaning. |
| Backing | None | None | Stainless Steel with Relief Groove. |
| Power Supply | Conventional Rectifier | Conventional Rectifier | Balanced Wave A.C. |
| Electrode | 3/8 in. Water Cooled Copper | 3/16 in. Water-Cooled Copper | 1/8 in. Tungsten. |
| Orifice | 5/32 in. Diameter, 1/8 in. Throat | 5/32 in. Diameter, 1/8 in. Throat | |
| Filler Wire | 3/64 in. Diameter, 4034 | 1/16 in. Diameter, 4043 | 0.030 in. Diameter 4043. |
| Position of Filler Wire Addition | Trailing | Leading | Leading. |
| Arc Current | 170 Amperes D.C.R.P. | 83 Amperes D.C.R.P. | 210 Amperes A.C. |
| Arc Voltage | 32 Volts | 29 Volts | |
| Arc Length | 9/32 in. | 9/32 in. | 3/32 in. |
| Travel Speed | 58 ipm | 32 ipm | 28 ipm. |
| Wire Feed Speed | 195 ipm | 59 ipm | 200 ipm. |
| Orifice Gas | 3 cfh Argon | 6 cfh Argon | |
| Shielding Gas | 30 cfh Argon | 80 cfh Helium | 13 cfh Argon. |
| Hot Wire Power Supply | C.P. Rectifier Slope Control | | |
| Hot Wire Current | 140 Amperes | | |
| Extension [1] | 3/4 in. | | |
| Average Ultimate Tensile Strength | 30,400 | 31,300 | 31,100. |
| Average percent Elongation in 2 in. | 6 | 4.5 | 4.5. |
| X-Ray Results | Clear | Clear | Clear. |

[1] Extension is defined as "the length of the filler wire between the hot wire contact tube and weld puddle."

Table I indicates that with the inventive system welds are made at approximately double the speed of the prior art processes. In addition, constricted arc welding has several significant advantages over conventional Heliarc welding with Balanced wave A.C. The excellent control of underbead and penetration of the constructed arc process permits welding with no backup. In Heliarc welding a backup bar with a relief groove is essential. It is necessary to cast the weld metal against the backup groove in order to insure consistency of penetration. A backup can be used with the constricted arc process, but is not needed. When used, it is only for the purpose of controlling heat sink but not for maintaining consistency of penetration as in Heliarc welding.

Larger diameter wire which is considerably cheaper can be used with the transferred constricted arc process. Another advantage of the constricted arc process is that considerably longer arc lengths can be used and small variations in arc length have relatively less effect upon the weld. The inventive system also holds advantages over constricted arc welding with cold wire addition. Gas costs are considerably reduced, especially since argon can be used to shield the weld zone in place of helium. Furthermore, the wire can be added in trailing relationship to the weld puddle making the wire feed considerably less critical and relatively independent of the main arc condition.

The only disadvantage of the inventive system is that it requires an additional power supply to provide the $I^2R$ heating of the filler metal. This is more than offset by the increased welding speed and the saving in gas costs. In addition, Balanced wave A.C. supplies are very expensive and the two relatively inexpensive power supplies employed in the present invention, in general, will cost no more than one Balanced wave A.C. unit.

Physical test results are virtually identical for each welding process. It might be expected that tensile strength would be greater and ductility lower for welds made with the system of the present invention where welding speeds are considerably greater than with the prior art welding processes. In practice this advantage was not obtained. The reason is probably due to the fact that a backup or chill bar was not used with the constricted arc welds. Thus, heat input to the workpiece was approximately equal to that of the Balanced wave A.C. Heliarc welds where the heat input, resulting from the lower welding speed, is offset by the use of a backup which acts as a heat sink in the heat-affected zone.

Another advantage of the present invention, previously discussed, but not brought out in the data of Table I, is the fact the weldable thickness range for all materials, as well as welding speed, is considerably greater than with nonconsumable electrode electric arc welding. Table II shows the upper limit of material thickness and the approximate welding speed at that thickness for stainless steel and aluminum welds made with the process of the present invention and with nonconsumable electrode electric arc welding.

TABLE II

| Material | Transferred Constricted Arc Welding with "Hot" Wire Addition | Nonconsumable Electrode Electric Arc Welding |
|---|---|---|
| Stainless Steel: | | |
| Maximum thickness (single pass welds). | 1/4 inch | 1/8 inch. |
| Weld speed at maximum thickness. | 12 ipm | 15 ipm. |
| Aluminum: | | |
| Maximum thickness (single pass welds). | 3/16 inch | 1/8 inch. |
| Weld speed at maximum thickness. | 35 ipm | 28 ipm. |

While the present disclosure refers to and describes the preferred embodiments of the invention, it is to be understood that certain modifications may be made to the apparatus shown and method described without departing from the spirit and scope of this invention.

What is claimed is:

1. An electric arc working process comprising establishing an arc between a nonconsumable electrode and a workpiece; introducing an arc gas into the region of said arc to produce an arc plasma; constricting and collimating said arc and arc plasma; directing said constricted and collimated arc and arc plasma as an arc effluent against said workpiece to form a molten puddle therein; feeding a wire from a source thereof to said molten puddle; continuously forming an arcless short circuit between said wire and said molten puddle to energize the end of such wire with current sufficient to melt such wire flowing through such end to thereby continuously deposit molten material supplied by the so-fed wire on the workpiece while shielding the zone of said molten puddle.

2. An electric arc welding process comprising establishing a reverse polarity arc between a water cooled nonconsumable electrode and the workpiece; introducing an arc gas into the region of said arc to produce an arc plasma; constricting and collimating said arc and arc plasma; directing said constricted and collimated arc and arc plasma as an arc effluent against said workpiece to form a molten puddle therein; feeding a wire from a source thereof to said molten puddle; continuously forming an arcless short circuit between said wire and said molten puddle to energize the end of such wire with current sufficient to melt such wire flowing through such end to thereby continuously deposit molten material supplied by the so-fed wire on the workpiece while shielding the zone of said molten puddle.

3. An electric arc welding process comprising establishing a straight polarity arc between a nonconsumable electrode and the workpiece; introducing an arc gas into the region of said arc to produce an arc plasma; constricting and collimating said arc and arc plasma; directing said constricted and collimated arc and arc plasma as an arc effluent against said workpiece to form a molten puddle therein; feeding a wire from a source thereof to said molten puddle; continuously forming an arcless short circuit between said wire and said molten puddle to energize the end of such wire with current sufficient to melt such wire flowing through such end to thereby continuously deposit molten material supplied by the so-fed wire on the workpiece while shielding the zone of said molten puddle.

4. An electric arc process for the welding of aluminum comprising establishing a reverse polarity arc between a water cooled copper electrode and an aluminum workpiece; introducing an arc gas into the region of said arc to produce an arc plasma; constricting and collimating said arc and arc plasma; directing said constricted and collimated arc and arc plasma as an arc effluent against said workpiece to form a molten puddle therein; feeding a wire from a source thereof to said molten puddle; continuously forming an arcless short circuit between said wire and said molten puddle to energize the end of such wire with current sufficient to melt such wire flowing through such end to thereby continuously deposit molten material supplied by the so-fed wire on the workpiece while shielding the zone of said molten puddle.

5. An electric arc process for the welding of aluminum comprising establishing a reverse polarity arc between a water cooled copper electrode and an aluminum workpiece; introducing an arc gas into the region of said arc to produce an arc plasma; constricting and collimating said arc and arc plasma; directing said constricted and collimated arc and arc plasma as an arc effluent against said workpiece to form a molten puddle therein; feeding a wire from a source thereof to said molten puddle; continuously forming an arcless short circuit between said wire and said molten puddle to energize the end of such wire with current sufficient to melt such wire flowing through such end to thereby continuously deposit molten material supplied by the so-fed wire on the workpiece while shielding such arc and molten puddle with a coherent stream of substantially nonturbulent shielding gas flowing in a direction substantially parallel to the longitudinal axis of said nonconsumable electrode.

References Cited in the file of this patent

UNITED STATES PATENTS

| | | |
|---|---|---|
| 2,437,840 | Steward et al. | Mar. 16, 1948 |
| 2,806,124 | Gage | Sept. 10, 1957 |
| 2,847,555 | Yenni | Aug. 12, 1958 |
| 2,897,341 | Mac Kusick | July 28, 1959 |